(12) United States Patent
Teranishi et al.

(10) Patent No.: US 11,229,882 B2
(45) Date of Patent: Jan. 25, 2022

(54) MONOLITHIC SEPARATION MEMBRANE STRUCTURE

(71) Applicant: NGK INSULATORS, LTD., Nagoya (JP)

(72) Inventors: Makoto Teranishi, Nagoya (JP); Kenji Yajima, Nagoya (JP); Hideyuki Suzuki, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 185 days.

(21) Appl. No.: 16/128,630

(22) Filed: Sep. 12, 2018

(65) Prior Publication Data

US 2019/0009219 A1 Jan. 10, 2019

Related U.S. Application Data

(63) Continuation of application No. PCT/JP2017/007881, filed on Feb. 28, 2017.

(30) Foreign Application Priority Data

Mar. 31, 2016 (JP) ............................. JP2016-072739

(51) Int. Cl.
*B01D 63/06* (2006.01)
*B01D 69/04* (2006.01)
(Continued)

(52) U.S. Cl.
CPC ........... *B01D 63/066* (2013.01); *B01D 69/00* (2013.01); *B01D 69/04* (2013.01); *B01D 69/10* (2013.01);
(Continued)

(58) Field of Classification Search
CPC .................................................. C04B 38/0009
See application file for complete search history.

(56) References Cited

U.S. PATENT DOCUMENTS

2005/0107244 A1* 5/2005 Ichikawa ............. B01D 53/885
502/60
2005/0279693 A1* 12/2005 Katsu ................. B01D 46/0039
210/321.87

(Continued)

FOREIGN PATENT DOCUMENTS

CN 103657422 A 3/2014
CN 204200312 U 3/2015
(Continued)

OTHER PUBLICATIONS

International Search Report and Written Opinion (Application No. PCT/JP2017/007881) dated Apr. 11, 2017.

(Continued)

*Primary Examiner* — Jason M Greene
*Assistant Examiner* — Eric J McCullough
(74) *Attorney, Agent, or Firm* — Burr & Brown, PLLC (57) ABSTRACT

A monolithic separation membrane structure according to the present invention includes a porous support body and a separation membrane. The porous support body has a plurality of filtration cells opening at both end surfaces, a plurality of water collecting cells closed on the both end surfaces, a plurality of discharge flow paths running through the plurality of water collecting cells and opening on an outer peripheral surface, and a monolithic base body including the outer peripheral surface. The separation membrane is formed on inside surfaces of the plurality of filtration cells. The plurality of filtration cells includes a first filtration cell and a second filtration cell which are adjacent to each other. The plurality of water collecting cells include water collecting cell which is adjacent to the first filtration cell and are separated from the second filtration cells. A thickness of a first partition wall of the base body between the first filtration cell and the water collecting cell is thicker than a (Continued)

thickness of a second partition wall of the base body between the first filtration cell and the second filtration cell.

5 Claims, 4 Drawing Sheets (51) Int. Cl.
*C04B 38/00* (2006.01)
*C04B 41/85* (2006.01)
*B01D 69/00* (2006.01)
*B01D 69/12* (2006.01)
*B01D 69/10* (2006.01)

(52) U.S. Cl.
CPC .............. *B01D 69/12* (2013.01); *C04B 38/00* (2013.01); *C04B 38/0009* (2013.01); *C04B 41/85* (2013.01)

(56) References Cited

U.S. PATENT DOCUMENTS

| 2006/0216464 A1* | 9/2006 | Yamada | B01D 69/046 428/116 |
| 2012/0074061 A1 | 3/2012 | Teranishi et al. | |
| 2014/0021129 A1* | 1/2014 | Teranishi | B01D 46/2425 210/500.26 |
| 2015/0008178 A1 | 1/2015 | Miyahara et al. | |
| 2015/0059306 A1* | 3/2015 | Iwasaki | B01D 46/247 55/529 |
| 2015/0086748 A1 | 3/2015 | Kato et al. | |

FOREIGN PATENT DOCUMENTS

| JP | 4094771 B2 * | 6/2008 |
| JP | 2014-028327 A1 | 2/2014 |
| WO | 2010/134514 A1 | 11/2010 |
| WO | 2013/147272 A1 | 10/2013 |

OTHER PUBLICATIONS

English translation of International Preliminary Report on Patentability (Chapter I) (Application No. PCT/JP2017/007881) dated Oct. 11, 2018.

Chinese Office Action (with English translation), Chinese Application No. 201780013562.1, dated Sep. 3, 2020 (14 pages).

* cited by examiner

MONOLITHIC SEPARATION MEMBRANE STRUCTURE

TECHNICAL FIELD

The present invention relates to a monolithic separation membrane structure.

BACKGROUND ART

A monolithic separation membrane structure is known which typically includes a porous support body that has a plurality of filtration cells and a plurality of water collection cells, and a separation membrane that is formed on an inner surface of each filtration cell (for example, reference is made to PCT Laid Open Application 2010/134514).

The porous support body includes a monolithic base body that has an outer peripheral surface. Each water collection cell opens on the outer peripheral surface of the porous support body through a discharge flow path.

The monolithic separation membrane structure disclosed in PCT Laid Open Application 2010/134514 has a partition wall thickness of the base body between two adjacent filtration cells that is set to be equal to the partition wall thickness of the base body between an adjacent filtration cell and water collecting cell.

SUMMARY OF THE INVENTION

However, when a permeation component is recovered from the discharge flow path as a mixed fluid flows under high pressure in each filtration cell of the monolithic separation membrane structure described above, there is a tendency for a load to accumulate in proximity to an end portion of the discharge flow path for outflow of a permeation component to the outer peripheral surface, particularly in a portion conjoining the discharge flow path and a water collecting cell. Therefore, there is a need to further improve the durability of the monolithic separation membrane structure by improving the pressure resistance characteristics of the base body.

The present invention is proposed in light of the situation described above, and has the purpose of providing a monolithic separation membrane structure with improved durability.

A monolithic separation membrane structure according to the present invention includes a porous support body and a separation membrane. The porous support body has a plurality of filtration cells opening at both end surfaces, a plurality of water collecting cells closed on the both end surfaces, a plurality of discharge flow paths running through the plurality of water collecting cells and opening on an outer peripheral surface, and a monolithic base body including the outer peripheral surface. The separation membrane is formed on inside surfaces of the plurality of filtration cells. The plurality of filtration cells includes a first filtration cell and a second filtration cell which are adjacent to each other. The plurality of water collecting cells include water collecting cell which is adjacent to the first filtration cell and are separated from the second filtration cells. A thickness of a first partition wall of the base body between the first filtration cell and the water collecting cell is thicker than a thickness of a second partition wall of the base body between the first filtration cell and the second filtration cell.

The present invention enables the provision of a monolithic separation membrane structure with improved durability.

DESCRIPTION OF EMBODIMENTS

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, the term "monolithic" is a concept that denotes a shape that includes a plurality of through holes formed in a longitudinal direction, and includes a honeycomb shape.

Figure 1:
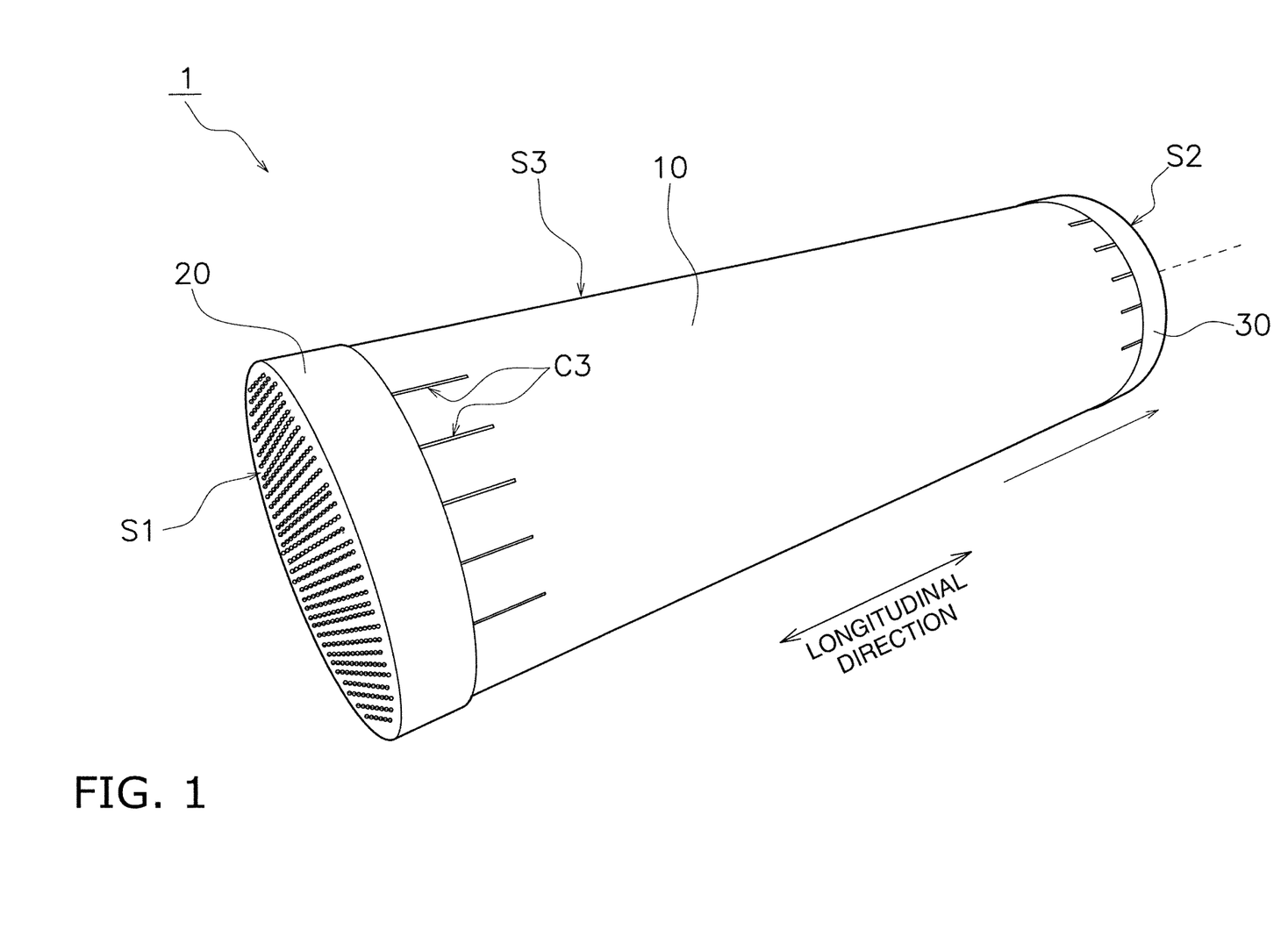
FIG. 1 is a perspective view illustrating a monolithic separation membrane structure.
Figure 2:
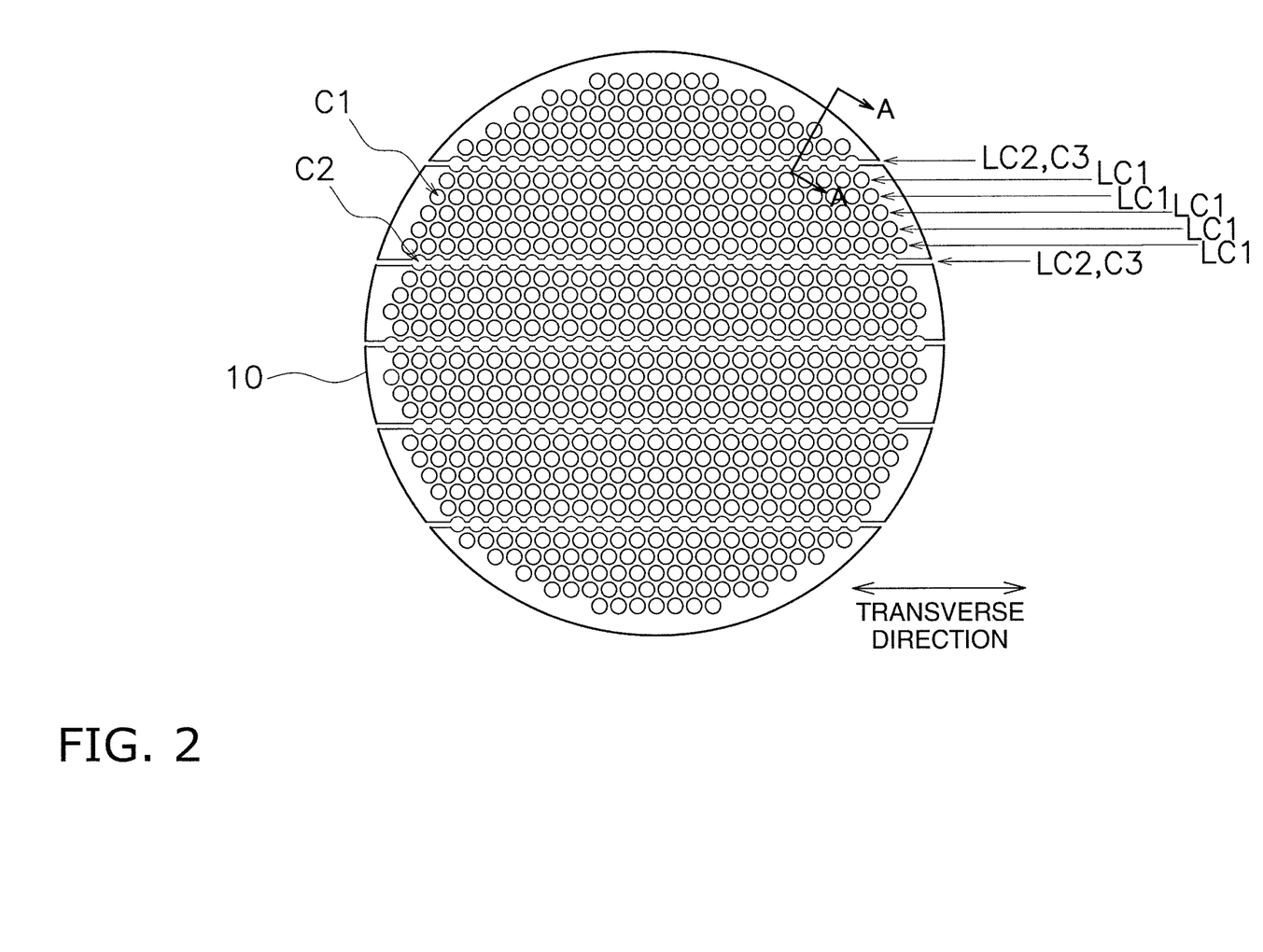
FIG. 2 is a sectional view of a monolithic separation membrane structure.
Figure 3:
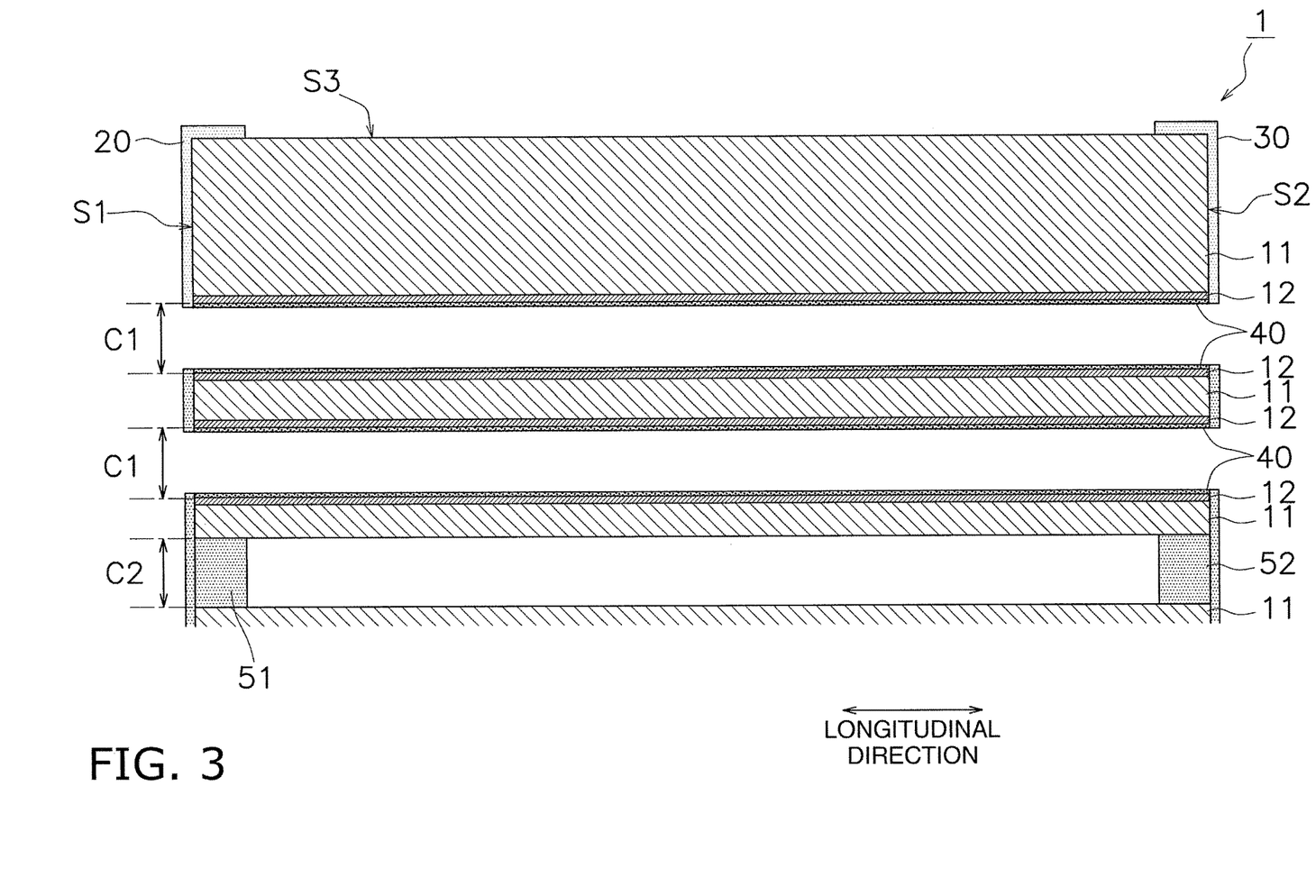
FIG. 3 is a sectional view along the line A-A of FIG. 2.

FIG. 1 is a perspective view illustrating a monolithic separation membrane structure. FIG. 2 is a sectional view of a monolithic separation membrane structure. FIG. 3 is a sectional view along the line A-A of FIG. 2. The monolithic separation membrane structure 1 is used to recover a predetermined component from a mixed fluid (mixed gas or mixed liquid). In particular, the monolithic separation membrane structure 1 according to the present embodiment is suitably applied to the separation of a target gas from a mixed gas, that is to say, to gas separation.

The monolithic separation membrane structure 1 is provided with a porous support body 10, a first seal portion 20, a second seal portion 30 and a separation membrane 40.

Configuration of Porous Support Body 10

The porous support body 10 is formed in a monolithic configuration to extend in a longitudinal direction. Both end surfaces of the porous support body 10 are plugged by the first seal portion 20 and the second seal portion 30. The porous support body 10 supports the separation membrane 40.

The porous support body 10 has a first end surface S1, a second end surface S2, and an outer peripheral surface S3. The first end surface S1 is provided opposite to the second end surface S2. The outer peripheral surface S3 is connected to an outer edge of the first end surface S1 and the second end surface S2. The outer peripheral surface S3 is a side surface of the porous support body 10.

The porous support body 10 includes a plurality of filtration cells C1, a plurality of water collecting cells C2 and a plurality of discharge flow paths C3. Each filtration cell C1 is formed in a longitudinal direction. Each filtration cell C1 opens onto the first end surface S1 and the second end surface S2. A mixed fluid under high pressure (for example greater than or equal to 4 MPa) flows in each filtration cell C1. Each water collecting cell C2 is formed in a longitudinal direction. Each water collecting cell C2 is closed at the first end surface S1 and the second end surface S2. Both longitudinal ends of each water collecting cell C2 as shown in FIG. 3 are plugged by a first plug 51 and a second plug 52. A component that can permeate the separation membrane 40

(referred to below as "permeation component") of a mixed fluid that flows in each filtration cell C1 is collected in each water collecting cell C2.

As illustrated in FIG. 2, the plurality of filtration cells C1 is formed in a row in a transverse direction that is orthogonal to the longitudinal direction and is formed in a plurality of filtration cell rows LC1. Each filtration cell row LC1 extends in a transverse direction. Furthermore as shown in FIG. 2, the plurality of water collecting cells C2 is disposed in a row in a transverse direction to thereby form a plurality of water collecting cell rows LC2. Each water collecting cell row LC2 extends in a transverse direction.

In the present embodiment, 28 filtration cell rows LC1 and 5 water collecting cell rows LC2 are formed with 4 rows or 5 rows of filtration cell rows LC1 being respectively disposed on both sides of each water collecting cell row LC2. Although the number of filtration cell rows LC1 and water collecting cell rows LC2 may be suitably varied, the number of filtration cell rows LC1 is preferably greater than or equal to twice, and more preferably greater than or equal to 5 times the number of water collecting cell rows LC2. In this manner, since the total surface area of the separation membrane 40 is increased and the number of filtration cells C1 is increased by the increased proportion of filtration cell rows LC1, the permeation amount of the permeation component can be increased.

As shown in FIG. 2, each discharge flow path C3 passes through the plurality of water collecting cells C2 contained in each water collecting cell row LC2. In the present embodiment, as shown in FIG. 1, two discharge flow paths C3 are disposed in a separate position in a longitudinal direction in each water collecting cell row LC2. Therefore there is a total of 10 discharge flow paths C3 in the present embodiment. Both ends of each discharge flow path C3 open onto the outer peripheral surface S3 of the porous support body 10. Therefore, the discharge flow paths C3 open at 20 positions on the outer peripheral surface S3. Although there is no particular limitation on the opening length of the discharge flow path C3 in a longitudinal direction, it is preferably less than or equal to 6% of the whole length of the porous support body 10 in a longitudinal direction, and more preferably less than or equal to 3%. In this manner, the occurrence of defects in the base body 11 during a molding step or firing step as described below can be inhibited since it is possible to reduce the creation of stress in a portion in proximity to an end portion of the discharge flow path C3, and in particular in a portion conjoining the discharge flow path C3 and a water collecting cell C2.

Furthermore, as shown in FIG. 3, the porous support body 10 includes a base body 11 and an intermediate layer 12.

The base body 11 configures the main portion of the porous support body 10. The base body 11 forms the outer peripheral surface S3 of the porous support body 10. The base body 11 is formed in a monolithic configuration. The base body 11 configures the partition wall between two adjacent filtration cells C1 and configures the partition wall between adjacent filtration cell C1 and collecting cell C2. The partition wall thickness of the base body 11 is described below.

The base body 11 includes a plurality of through holes that form each filtration cell C1 and each water collecting cell C2. Of the plurality of through holes, the intermediate layer 12 is formed on an inner surface of a through hole that forms a filtration cell C1. Conversely, the inner side of the intermediate layer 12 constitutes the filtration cell C1. On the other hand, the intermediate layer 12 is not formed on an inner surface of a through hole that forms a water collecting cell C2 of the plurality of through holes, and the inner side of the through hole continues to be a water collecting cell C2. Although there is no particular limitation in relation to the inner diameter of the water collecting cell C2, it may be configured as greater than or equal to 0.5 mm and less than or equal to 3.0 mm. Permeation resistance to a permeation component can be reduced by a configuration in which the inner diameter of the water collecting cell C2 is greater than or equal to 0.5 mm. The disposition density of the water collecting cells C2 can be increased by a configuration in which the inner diameter of the water collecting cell C2 is less than or equal to 3.0 mm.

Although there is no particular limitation on the size of the base body 11, and it may be configured with a length of 100 to 2000 mm and a diameter of 30 to 220 mm. The base body 11 is configured by a porous material. The base body 11 contains an aggregate and a binding material.

The aggregate includes use of alumina, silicon carbide, titania, mullite, selben, cordierite, or the like. The binding material is a non-organic oxide material that melts at a lower temperature than the aggregate component and that binds the aggregate together. The content ratio of the aggregate in the base body 11 may be configured as greater than or equal to 60 volume % and less than or equal to 80 volume %, and is preferably greater than or equal to 65 volume % and less than or equal to 75 volume %. The content ratio of the aggregate may be calculated by component analysis of the base body 11.

The binding material includes use of an alumina or silica based inorganic oxide material that contains an alkali metal, an alkali earth metal or the like. The oxide material that is used as the binding material is a glass material that contains silicon (Si) and aluminum (Al) and at least one of an alkali metal or an alkali earth metal. The alkali metal includes use of at least one of sodium (Na), potassium (K) and lithium (Li). The oxide material may contain an alkali metal as an alkali metal oxide. The alkali earth metal includes use of at least one of magnesium (Mg), calcium (Ca), strontium (Sr) and barium (Ba). The oxide material may contain an alkali earth metal as an alkali earth metal oxide. The oxide material preferably includes both of an alkali metal and an alkali earth metal. The oxide material may contain Si as $SiO_2$. The oxide material may contain Al as $Al_2O_3$. The content ratio of the oxide material in the base body 11 may be configured as greater than or equal to 20 volume % and less than or equal to 40 volume %, and is preferably greater than or equal to 25 volume % and less than or equal to 35 volume %. The content ratio of the oxide material may be calculated by component analysis of the base body 11.

Although there is no particular limitation in relation to the porosity of the base body 11, it may be configured as 25% to 50%, and is preferably 30% to 45%. The porosity of the base body 11 may be measured using a mercury press-in method. Although there is no particular limitation on the average pore diameter of the base body 11, it may be configured as 0.1 μm to 50 μm, and from the point of view of facilitating membrane formation of the intermediate layer 12, it is preferably configured as 1 μm to 10 μm.

The intermediate layer 12 is formed on an inner surface of the base body 11. The intermediate layer 12 is formed in a tubular configuration. The inner side of the intermediate layer 12 forms the filtration cell C1. In the present embodiment, the intermediate layer 12 is not formed on each water collecting cell C2, and the space on an inner side of the base body 11 forms the water collecting cell C2.

The intermediate layer 12 contains an aggregate and a binding material. The aggregate includes use of alumina, titania, mullite, selben, cordierite, or the like. The binding material includes use of sinterable alumina, titania, silica, glass fits, clay minerals, sinterable cordierite, or the like.

The ratio of the binding material in the non-organic solid portion (aggregate+binding material) in the intermediate layer 12 may be configured as greater than or equal to 5 mass % and less than or equal to 42 mass %. From the point of view of imparting strength to the intermediate layer 12, a value of greater than or equal to 10 mass % and less than or equal to 42 mass % is preferred, and greater than or equal to 15 mass % and less than or equal to 42 mass % is more preferred.

Although there is no particular limitation on the thickness of the intermediate layer 12, it is preferably greater than or equal to 20 μm and less than 300 μm, and more preferably greater than or equal to 50 μm and less than 300 μm. A configuration in which the thickness of the intermediate layer 12 is greater than or equal to 20 μm inhibits the occurrence of membrane defects by smoothing the surface of the intermediate layer 12. A configuration in which the thickness of the intermediate layer 12 is less than 300 μm enables the total surface area of the separation membrane 30 to be increased.

The intermediate layer 12 may be configured by a plurality of layers having different average pore diameters and average particle diameters (median diameters). In such a configuration, the average pore diameter and average particle diameter may increase as the base body 11 is approached. For example, when the intermediate layer 12 has a double layer structure, the average pore diameter of a first layer that makes contact with the base body 11 is about 1 μm, and the average pore diameter of a second layer that is formed on an inner surface of the first layer is about 0.1 μm.

Although there is no particular limitation on the inner diameter of the intermediate layer 12 (that is to say, the diameter of the filtration cells C1), it may be configured as greater than or equal to 1.0 mm and less than or equal to 3.0 mm. A configuration in which the inner diameter of the intermediate layer 12 is greater than or equal to 1.0 mm enhances the flow characteristics of a mixed fluid. A configuration in which the inner diameter of the intermediate layer 12 is less than or equal to 3.0 mm increases the permeation amount of a permeation component since the total membrane surface area of the separation membrane 40 can be increased by increasing the number of filtration cells C1.

First Seal Portion 20 and Second Seal Portion 30

The first seal portion 20 covers a portion of the outer peripheral face S3 and the whole surface of the first end face S1. The first seal portion 20 suppresses infiltration of a mixed fluid into the first end face S1. The first seal portion 20 is formed so that the inflow port of the filtration cells C1 is not blocked. The first seal portion 20 may cover a portion of the inner side of the filtration cells C1. The first seal portion 20 covers the surface of the first plug 51. The material that configures the first seal portion 20 includes glass or metal, rubber, resin, or the like, with glass being preferred in light of its consistency with the coefficient of thermal expansion of the base body 11.

The second seal portion 30 covers a portion of the outer peripheral face S3 and the whole surface of the second end face S2. The second seal portion 30 suppresses infiltration of a mixed fluid into the second end face S2. The second seal portion 30 is formed so that the inflow port of the filtration cells C1 is not blocked. The second seal portion 30 may cover a portion of the inner side of the filtration cells C1. The second seal portion 30 covers the surface the second plug 52. The second seal portion 30 may be configured from the same material that configures the first seal portion 20.

Separation Membrane 40

The separation membrane 40 is formed on an inner surface of the intermediate layer 12. The separation membrane 40 is formed in a tubular configuration. The separation membrane 40 enables permeation of a permeation separation component contained in the mixed fluid. The separation function of the monolithic separation membrane structure 1 is displayed with reference to the separation membrane 40.

The average pore diameter of the separation membrane 40 may be suitably determined based on a required filtration function and separation function. For example, the average pore diameter of the separation membrane 40 may be configured for example to 0.0003 μm (0.3 nm) to 1.0 μm. The average pore diameter of the separation membrane 40 may be measured with reference to a perm-porometry method or an airflow method as disclosed in ASTM F316.

The separation membrane 30 may use a known MF (microfiltration) membrane, UF (ultrafiltration) membrane, gas separation membrane, pervaporation membrane or vapor permeable membrane, or the like. More specifically, the separation membrane 30 includes use of a ceramic membrane (for example, reference is made to Japanese Patent Application Laid-Open No. 3-267129, Japanese Patent Application Laid-Open No. 2008-246304), a carbon monoxide separation membrane (for example, reference is made to Japanese Patent No. 4006107), a helium separation membrane (for example, reference is made to Japanese Patent No. 3953833), a hydrogen separation membrane (for example, reference is made to Japanese Patent No. 3933907), a carbon membrane (for example, reference is made to Japanese Patent Application Laid-Open No. 2003-286018), a zeolite membrane (for example, reference is made to Japanese Patent Application Laid-Open No. 2004-66188), a silica membrane (for example, reference is made to the pamphlet of PCT Laid Open Application 2008/050812), an organic-inorganic hybrid silica membrane (for example, reference is made to Japanese Patent Application Laid-Open No. 2013-203618), and p-tolyl group-containing silica membrane (for example, reference is made to Japanese Patent Application Laid-Open No. 2013-226541) or the like.

Although there is no particular limitation in relation to the inner diameter of the separation membrane 40, it may be configured to be greater than or equal to 0.8 mm or less than or equal to 2.96 mm. A configuration in which the inner diameter of the separation membrane 40 is greater than or equal to 0.8 mm enhances flow characteristics of the mixed fluid. A configuration in which the inner diameter of the separation membrane 40 is less than or equal to 2.96 mm increases the permeation amount of a permeation component since the total membrane surface area of the separation membrane 40 can be increased by increasing the number of filtration cells C1.

Partition Wall Thickness of Base Body 11

Figure 4:
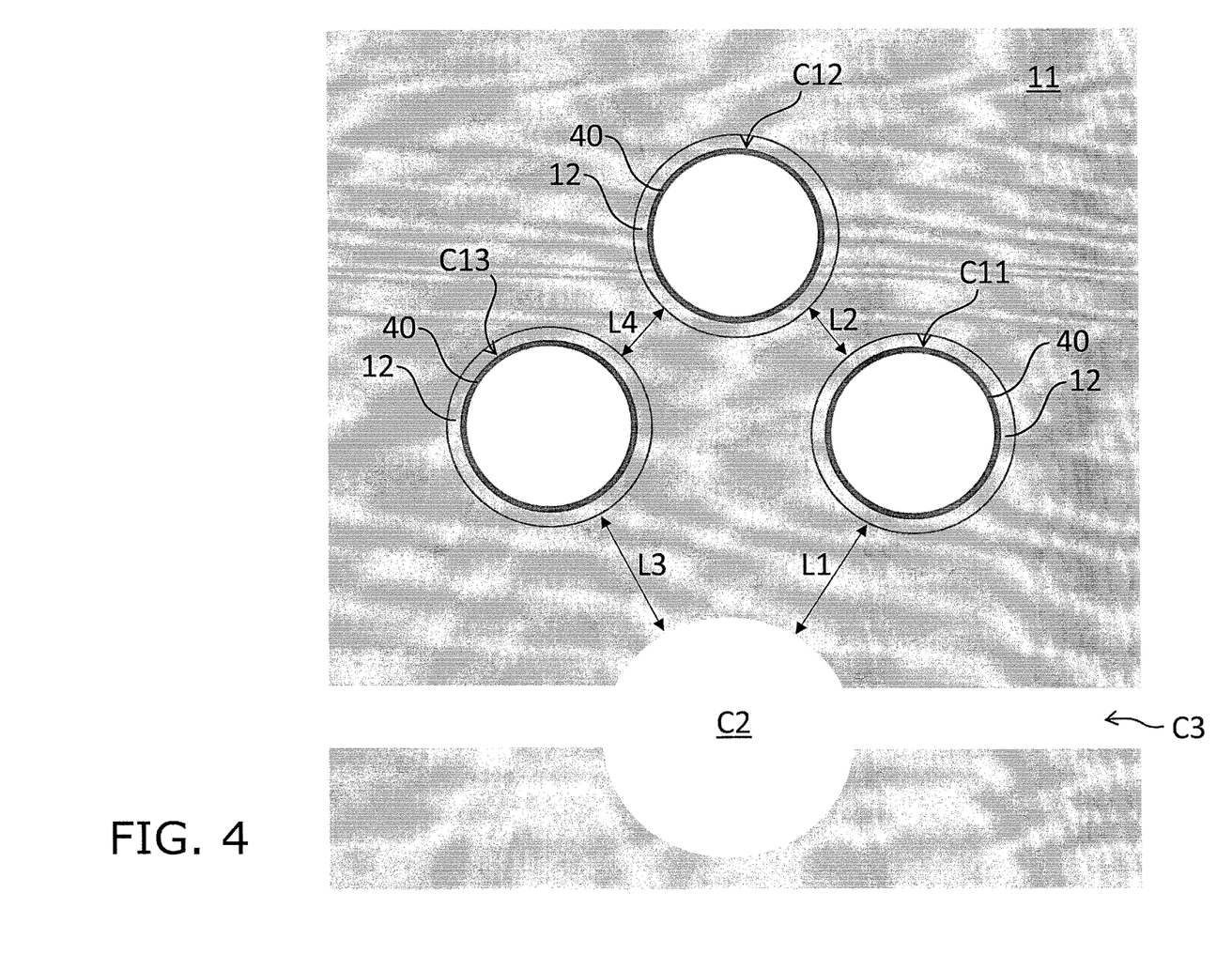
FIG. 4 is a partial enlargement of FIG. 2.

FIG. 4 is a partially enlarged view of FIG. 2. The following description will focus on one water collecting cell C2 and three filtration cells C1 (first filtration cell C11, second filtration cell C12 and third filtration cell C13) that are disposed in its periphery.

The first filtration cell C11 is adjacent to the water collecting cell C2. The first filtration cell C11 is adjacent to the second filtration cell C12. The first filtration cell C11 is more separated from the third filtration cell C13 than the second filtration cell C12. The second filtration cell C12 is more separated from the water collecting cell C2 than the first filtration cell C11. The third filtration cell C13 has the same positional relationship as the first filtration cell C11 in relation to the water collecting cell C2 and the second filtration cell C12.

A first partition wall thickness L1 of the base body 11 between the first filtration cell C11 and the water collecting cell C2 is thicker than a second partition wall thickness L2 of the base body between the first filtration cell C11 and the second filtration cell C12. The first partition wall thickness L1 is the minimum thickness of a region sandwiched between the first filtration cell C11 and the water collecting cell C2 of the base body 11. The second partition wall thickness L2 is the minimum thickness of a region sandwiched between the first filtration cell C11 and the second filtration cell C12 of the base body 11.

A configuration in which the first partition wall thickness L1 is thicker than the second partition wall thickness L2 enables an improvement to the pressure resistant characteristics of the base body 11 in the periphery of the water collecting cell C2 that is most likely to be under pressure when recovering a permeation component from the discharge flow path C3 during flow of a high-pressure mixed fluid (in particular a mixed gas) in each filtration cell C1. As a result, the durability of the monolithic separation membrane structure 1 can be improved.

The first partition wall thickness L1 is preferably greater than or equal to 1.2 times the second partition wall thickness L2, more preferably greater than or equal to 1.5 times the second partition wall thickness L2, and still more preferably greater than or equal to 2.0 times the second partition wall thickness L2.

In the same manner, a third partition wall thickness L3 of the base body 11 between the third filtration cell C13 and the water collecting cell C2 is thicker than a fourth partition wall thickness L4 of the base body between the third filtration cell C13 and the second filtration cell C12. The third partition wall thickness L3 is the minimum thickness of a region sandwiched between the third filtration cell C13 and the water collecting cell C2 of the base body 11. The fourth partition wall thickness L4 is the minimum thickness of a region sandwiched between the third filtration cell C13 and the second filtration cell C12 of the base body 11.

A configuration in which the third partition wall thickness L3 is thicker than the fourth partition wall thickness L4 enables an improvement to the pressure resistant characteristics of the base body 11 in the periphery of the water collecting cell C2 that is most likely to be under pressure when recovering a permeation component from the discharge flow path C3 during flow of a high-pressure mixed fluid in each filtration cell C1. As a result, the durability of the monolithic separation membrane structure 1 can be improved.

The third partition wall thickness L3 is preferably greater than or equal to 1.2 times the fourth partition wall thickness L4, more preferably greater than or equal to 1.5 times the fourth partition wall thickness L4, and still more preferably greater than or equal to 2.0 times the fourth partition wall thickness L4.

Method of Manufacturing Monolithic Separation Membrane Structure 1

Firstly, a clay is prepared by adding water, a dispersant and an organic binder such as methyl cellulose to aggregate particles and an inorganic binding material, and then kneading. The prepared clay is used to form a molded body for the monolithic base body 11. At that time, the mold shape used for molding the clay is adjusted in order to form through holes that satisfy the relationship of the first to the fourth partition wall thickness L1 to L4 as shown in FIG. 4. The method of forming the molded body for the base body 11 includes use of slip casting molding, a press molding, in addition to extrusion molding using a vacuum extruder. The average particle diameter of the aggregate particles may be configured to be greater than or equal to 5 μm and less than 40 μm. The average particle size of the inorganic binding material may be configured to be greater than or equal to 0.1 μm and less than or equal to 10 μm.

Next, a sharp tool is used to form a plurality of discharge flow paths C3 through the outer peripheral surface S3 of the molded body of the base body 11. At that time, the opening length of each discharge flow path C3 in a longitudinal direction is adjusted to thereby adjust the opening length of the discharge flow path C3 relative to the whole length of the porous support body 10.

Next, a slurry for a plug is prepared by adding an organic binder, a sintering additive, a pH regulating agent, and an surface active agent to the porous material.

Then the slurry for a plug is caused to flow into the position of those through holes that form water collecting cells C2 of the plurality of through holes in the molded body for the base body 11 to thereby form a green body for the first and second plugs 51, 52.

Next, the base body 11 is formed by firing the molded body for the base body 11 and the green body for the first and second plugs 51, 52 (for example, 500 degrees C. to 1500 degrees C., 0.5 hours to 80 hours).

Next, the intermediate layer 12 is formed on an inner surface of those through holes that form the filtration cells C1 of the plurality of through holes that are formed in the base body 11. The intermediate layer 12 is formed by coating the intermediate layer slurry that includes addition of water to a ceramic material for the intermediate layer 12 onto an inner surface of the through holes by use of a filtration method of flow-down method and firing (900 degrees C. to 1350 degrees C.).

Next, the separation membrane 40 is formed on an inner surface of the intermediate layer 12. The method of forming the separation membrane may adopt a method that is adapted to the type of membrane for the separation membrane 40.

Then, water and an inorganic binder are mixed into glass frit to thereby prepare a glass seal slurry. A glass seal slurry is coated onto the first and second end surfaces S1 and S2 of the base body 11 to thereby form a green body for the first and second seal portions 20, 30. Then the green body for the first and second seal portions 20, 30 is fired (800 to 1000 degrees C., 1 hour to 100 hours) to thereby first the first and second seal portions 20, 30.

Other Embodiments

Although an embodiment of the present invention has been described, the present invention is not limited to the above embodiment, and various modifications are possible within a scope that does not depart from the spirit of the invention.

In the present embodiment, although the positional relationship of the filtration cells C1 and the water collecting cells C2 has been described making reference to FIG. 4, and although the relationship between the first and second partition wall thickness L1 and L2 is established between all filtration cells C1 and water collecting cells C2, there is no particular limitation in this regard. The relationship between the first and second partition wall thickness L1 and L2 as shown in FIG. 4 is preferably established between greater than or equal to 60% of the filtration cells C1 and water collecting cells C2, and more preferably established between greater than or equal to 80% of the filtration cells C1 and water collecting cells C2.

In the present embodiment, the porous support body 10 includes the base body 11 and the intermediate layer 12. However, the intermediate layer 12 may be omitted. Furthermore, a further surface layer may be formed on an inner surface of the intermediate layer 12. In this configuration, the separation membrane 40 may be formed on an inner surface of the surface layer after forming the surface layer on an inner surface of the intermediate layer 12. The average pore diameter and average particle diameter of the surface layer may be configured to be smaller than the average pore diameter and average particle diameter of the intermediate layer 12. When the porous support body 10 includes a surface layer that is formed on an inner surface of the intermediate layer 12, the inner side of the surface layer becomes the filtration cells C1.

Examples

Preparation of Sample Nos. 1 to 9

A monolithic separation membrane structure according to Examples No. 1 to No. 9 was prepared as described below.

Firstly, 70 volume % of alumina particles (aggregate) having an average particle diameter of 12 µm was added to 30 volume % of an inorganic binding material, then as required, further addition was made of a molding auxiliary agent such as an organic binder or the like and a pore forming agent, and mixed and dried. Then, a clay was prepared by adding water and a surface active agent, and mixing and kneading. The inorganic binding material used a configuration in which talc, kaolin, feldspar, clay or the like having an average particle diameter of 1 to 5 µm were suitably mixed to reach target content ratios of $SiO_2$ (70 mass %), $Al_2O_3$ (16 mass %), alkali earth metals and alkali metals (11 mass %).

Next, the clay was extrusion molded to thereby form a molded body for a monolithic base body that has a plurality of cells. A sharp tool was used to form a plurality of discharge flow paths that pass through an outer peripheral surface of the molded body for the base body. At that time, as shown in Table 1, a configuration in which the opening length of the discharge flow paths in the outer peripheral surface is adjusted enables adjustment of the ratio for each sample of the opening length on the outer peripheral surface.

Next, a slurry for a plug was prepared by adding an organic binder, a sintering additive, a pH regulating agent, and an surface active agent to the alumina for the porous material. A configuration in which the slurry for a plug is caused to flow into both end portions of the molded body of the base body was used to form the green body for the first and second plugs.

Next, a polyester film was adhered to both end faces of the monolithic base body, and a hole was drilled with reference to laser irradiation in a portion corresponding to the water collecting cell row.

Then, both end faces of the monolithic base body were pressed into a slurry for a plug that is in a slurry configuration. The slurry for a plug was configured by adding a glass binding material to a main component of alumina aggregate, and then water and a binder were added and mixed.

Then, the monolithic base body filled with the plug was fired (1250 degrees C., one hour) to thereby obtain a plug filled monolithic base body. The ratio of the row number of filtration cell rows to the row number of water collecting cell rows in each sample (number of filtration cell rows/number of water collecting cell rows) is shown in Table 1.

Next, 14 parts by mass of an inorganic binding material were added to 100 parts by mass of alumina particles (aggregate) having an average particle diameter of 2.3 µm, and then further addition was made of water, a dispersion agent and a thickening agent, and mixed to prepare an intermediate layer slurry. The intermediate layer slurry was formed as a membrane by use of a filtration method on an inner surface of the through holes that prevent plugging of the base body to thereby form a green body for the intermediate layer. Next, the green body for the intermediate layer was fired (1250 degrees C., 1 hour) to form the intermediate layer.

Next, alumina particles (aggregate) having an average particle diameter of 0.2 µm, water and a dispersion agent were mixed to prepare a surface layer slurry. The surface layer slurry was formed as a membrane by use of a filtration method on an inner surface of the through holes that prevent plugging the monolithic base body to thereby form a green body for the surface layer. Next, the green body for the surface layer was fired (1250 degrees C., 12 hours) to form the surface layer.

Next, the base body was cut into a size of diameter of 180 mmφ and length of 1000 mm. After spraying the glass starting material slurry and coating both end surfaces of the base body, the seal portion was formed on both end surfaces by firing (950 degrees C., 1 hour).

Next, a DDR type zeolite membrane was formed as a separation membrane based on the method disclosed in PCT Laid Open Application WO2011105511.

Maximum Stress Calculation in Water Collecting Cell

The maximum stress applied to an inner surface of a water collecting cell when a pressure of 1 MPa is applied to an inner surface of a filtration cell was calculated. The calculation results are shown in Table 1. The calculation of the maximum stress used a finite element analysis program (I-deas).

Membrane Surface Area Ratio

The total surface area of the zeolite membrane in each sample is shown in Table 1. In Table 1, the total surface area of Sample No. 1 is entered as a normalized reference value of (1.00). The total surface area of the zeolite membrane is approximately the same as the total inner surface area of the filtration cells.

Bubble Testing

After filling all the filtration cells formed in each sample with water, air was supplied from an outer surface of the porous support body. Those cells that are observed to produce air bubbles in the filtration cells at an air supply pressure amount of less than or equal to 0.18 MPa, are denoted as defective cells. The number of defective cells in Sample Nos. 2, 3, 5, 6, 8 and 9 is shown in Table 1.

TABLE 1

| Sample No. | Second Partition Wall Thickness L2 of Base Body between Two Filtration Cells (mm) | First Partition Wall Thickness L1 of Base Body between Filtration Cell and Water Collecting Cell (mm) | Maximum Stress on Water Collecting Cell (MPa) | Number of Filtration Cell Rows/ Number of Water Collecting Cell Rows (times) | Surface Area of Separation Membrane | Opening Length Ratio of Each Discharge Flow Path Relative to Whole Length of Support Body (%) | Number of Defective Cells |
|---|---|---|---|---|---|---|---|
| 1 | 0.65 | 0.65 | 8.7 | 5.6 | 1.00 | 6 | — |
| 2 | 0.65 | 1.3 | 5.3 | 5.6 | 0.88 | 6 | 58 |
| 3 | 0.65 | 1.3 | 5.3 | 2.1 | 0.70 | 6 | 72 |
| 4 | 0.65 | 1.3 | 5.3 | 1.0 | 0.52 | 6 | — |
| 5 | 0.65 | 1.3 | 4.8 | 5.6 | 0.88 | 3 | 49 |
| 6 | 0.65 | 1.3 | 4.8 | 2.1 | 0.70 | 3 | 52 |
| 7 | 0.65 | 1.3 | 4.8 | 1.0 | 0.52 | 3 | — |
| 8 | 0.65 | 1.3 | 5.6 | 5.6 | 0.88 | 10 | 105 |
| 9 | 0.65 | 1.3 | 5.6 | 2.1 | 0.70 | 10 | 143 |

As shown in Table 1, the maximum stress that is applied to an inner surface of a water collecting cell was inhibited in Sample Nos. 2 to 9 in which the first partition wall thickness L1 between a filtration cell and water collecting cell is greater than a second partition wall thickness L2 between a filtration cell and filtration cell. This feature is due to the fact that a configuration in which the first partition wall thickness L1 between a filtration cell and water collecting cell is increased enables an improvement in the pressure resistance characteristics of the base body in the periphery of a water collecting cell that tends to accumulate load.

A comparison of Sample No. 3 and Sample No. 4 confirms that the total surface area of the separation membrane is increased by a configuration in which the filtration cell row number is greater than or equal to twice the water collecting cell row number. Therefore a configuration in which the filtration cell row number is configured to be greater than or equal to twice the water collecting cell row number can be seen to increase the amount of the permeation component that permeates the separation membrane. This feature can also be confirmed by a comparison of Sample No. 6 and Sample No. 7.

Furthermore, a comparison of Sample No. 2 and Sample No. 3 confirms that the total surface area of the separation membrane is further increased by a configuration in which the filtration cell row number is greater than or equal to 5 times the water collecting cell row number. Therefore a configuration in which the filtration cell row number is configured to be greater than or equal to 5 times the water collecting cell row number can be seen to further increase the amount of the permeation component that permeates the separation membrane. This feature can also be confirmed by a comparison of Sample No. 5 and Sample No. 6.

A comparison of Sample Nos. 2 and 3 and Sample Nos. 8 and 9 confirms that the maximum stress applied to a water collecting cell is suppressed by a configuration in which the opening length of the discharge flow path is less than or equal to 6% of the whole length of the porous support body. This result enables a reduction in the defects in the filtration cells since it is possible to inhibit the production of defects in the base body during the molding step or firing step in Sample Nos. 2 and 3.

A comparison of Sample Nos. 2 and 3 and Sample Nos. 5 and 6 confirms that the maximum stress applied to a water collecting cell is suppressed by a configuration in which the opening length of the discharge flow path is less than or equal to 3% of the whole length of the porous support body. This result enables a further reduction in defects in filtration cells in Sample Nos. 5 and 6.

The invention claimed is:

1. A monolithic separation membrane structure comprising:
   a porous support body having a plurality of filtration cells opening at both end surfaces, a plurality of water collecting cells closed on the both end surfaces, a plurality of discharge flow paths running through the plurality of water collecting cells and opening on an outer peripheral surface, and a monolithic base body including the outer peripheral surface, and
   a separation membrane formed on inside surfaces of the plurality of filtration cells, wherein
   the plurality of filtration cells includes a first filtration cell and a second filtration cell which are adjacent to each other,
   the plurality of water collecting cells include a water collecting cell which is adjacent to the first filtration cell and are separated from the second filtration cells, and
   a thickness of a first partition wall of the base body, which is a shortest distance between an outermost edge of the first filtration cell and an outermost edge of the water collecting cell, is thicker than a thickness of a second partition wall of the base body, which is a shortest distance between an outermost edge of the first filtration cell and an outermost edge of the second filtration cell.

2. The monolithic separation membrane structure according to claim 1, wherein a number of rows of the plurality of the filtration cells is greater than or equal to twice a number of rows of the plurality of the water collecting cells.

3. The monolithic separation membrane structure according to claim 2, wherein a number of rows of the plurality of the filtration cells is greater than or equal to 5 times a number of rows of the plurality of the water collecting cells.

4. The monolithic separation membrane structure according to claim 1, wherein an opening length of the plurality of respective discharge flow paths is less than or equal to 6% of a whole length of the porous support body.

5. The monolithic separation membrane structure according to claim 4, wherein the opening length of the plurality of respective discharge flow paths is less than or equal to 3% of the whole length of the porous support body.

\* \* \* \* \*